Jan. 16, 1923.

B. J. STEEN.
ENGINE STARTER.
ORIGINAL FILED OCT. 19, 1920.

1,442,366.

Inventor
Buford J. Steen
By
Hardway Cushing
Attorney

Patented Jan. 16, 1923.

1,442,366

UNITED STATES PATENT OFFICE.

BUFORD J. STEEN, OF CHRISTINE, TEXAS.

ENGINE STARTER.

Application filed October 19, 1920, Serial No. 418,105. Renewed November 28, 1922.

*To all whom it may concern:*

Be it known that I, BUFORD J. STEEN, a citizen of the United States, residing at Christine, in the county of Atascosa and State of Texas, have invented certain new and useful Improvements in an Engine Starter, of which the following is a specification.

This invention relates to new and useful improvements in an engine starter.

One object of the invention is to provide a device of the character described which is specially adapted for use in connection with the fly-wheel of an engine whereby the engine may be turned off of dead center when it is desired to start the same.

As is well known to those familiar with the operation of engines, the engine often stops on dead center and must be manually turned off of dead center in order to start same. It is the object of this invention to provide a device of the character described whereby said engine may be thrown off of dead center mechanically and without turning the fly-wheel by hand, which is the customary way now employed.

With the above and other objects in view, the invention has particular relation to certain novel features of construction, operation and arrangement of parts, an example of which is given in this specification and illustrated in the accompanying drawings, wherein:—

Figure 1:
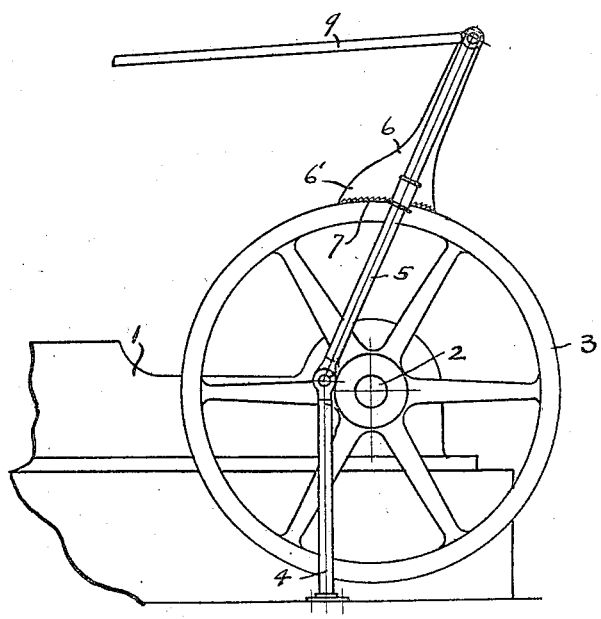
Figure 1 is a side elevation of the device.
Figure 2:
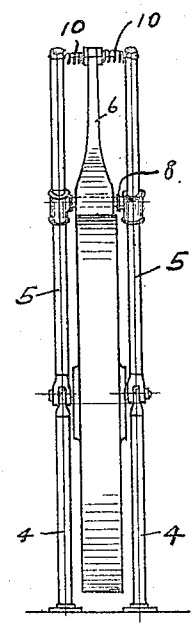
Figure 2 is a rear view.

Referring now more particularly to the drawings, the numeral 1 designates an engine having the crank shaft 2 and the fly-wheel 3 fixed thereon. On opposite sides of the fly-wheel are the standards 4, 4 to the upper ends of which the lower ends of the levers 5, 5 respectively, are pivoted. A dog 6 is provided. The operative face 7 of this dog is arcuate in form and toothed. The dog is pivoted on the transverse bearing pin 8, whose respective ends are anchored to the side levers 5, 5. Pivoted to the upper end of the dog 6 there is the operating rod 9 which extends to the cab or engine room so as to be within easy reach of the engineer, and pull springs 10, 10 connect the upper end of said dog to the upper ends of the levers 5. When the engine stops on dead center and it is desired to start the same, the rod 9 is first forced back to the position shown in Figure 1 and then pulled forwardly, causing the dog 6 to turn on the bearing pin 8 and the forward extension 6' thereof will engage with the periphery of the fly-wheel and turn said wheel off of dead center. The pivotal attachment of the levers 5 is eccentric relative to the fly-wheel and when the wheel is turned off of dead center a further pull on the rod 9 will cause the dog to clear the fly-wheel.

What I claim is:—

1. In a device of the character described the combination with a motor having a fly wheel, of a lever arranged adjacent said fly wheel, one end of which is pivoted to a support, a dog pivoted at an intermediate point to said lever and arranged to be brought into engagement with the periphery of said fly wheel, a yieldable member connecting the other end of the dog to said lever, and an operating rod for actuating the dog.

2. In a device of the character described, the combination with a motor having a fly wheel, of a lever arranged adjacent said fly wheel, one end of which is pivoted to a support, a dog pivoted at an intermediate point to said lever, one end of said dog adjacent the fly wheel being arcuate and toothed, said toothed end being normally concentric with the fly wheel, a yieldable member connecting the other end of said dog to said lever and an operating rod for actuating the dog and lever.

In testimony whereof I have signed my name to this specification in the presence of two subscribing witnesses.

BUFORD J. STEEN.

Witnesses:
 E. V. HARDWAY,
 LORENA FAHRENTHOLD.